Sept. 27, 1966     C. R. BARLOW     3,275,198
AIR STREAM DRIVEN PUMPING SYSTEM
Original Filed April 5, 1962
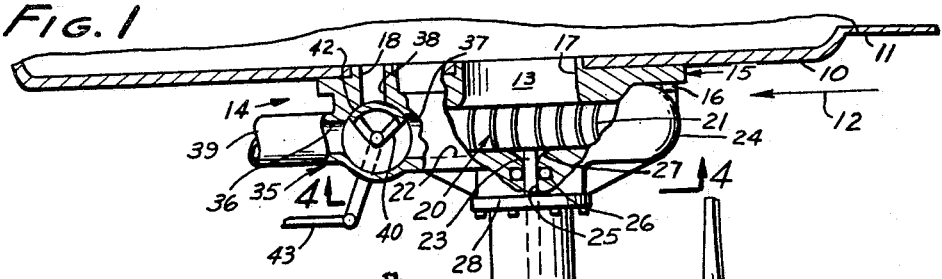
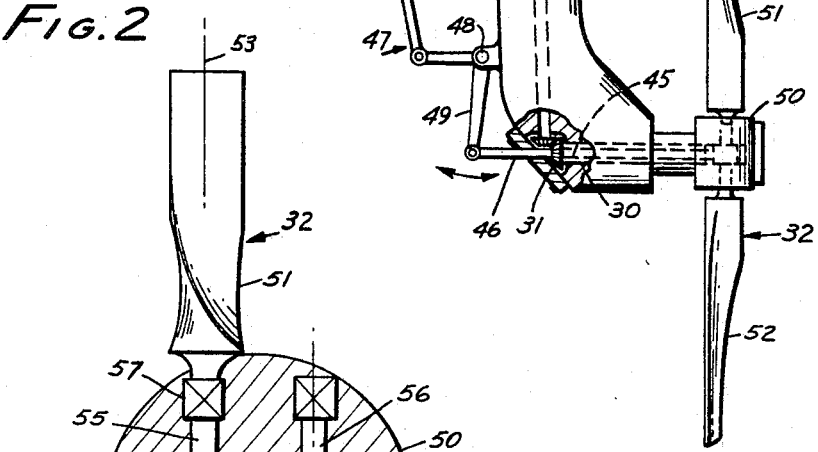
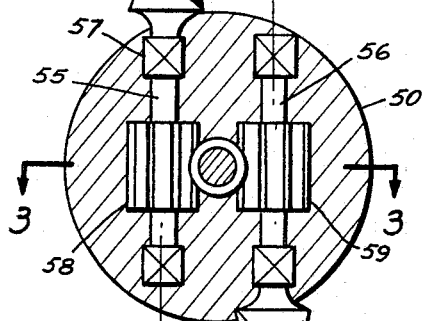
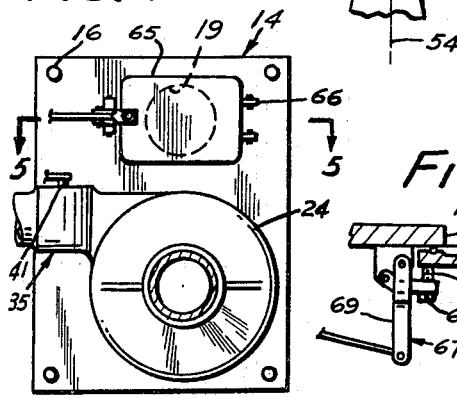
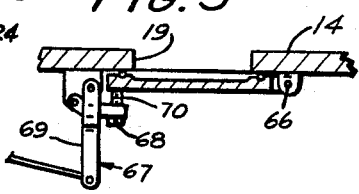
INVENTOR.
CONRAD R. BARLOW
BY
*Angus & Mow*
ATTORNEYS.

United States Patent Office 3,275,198
Patented Sept. 27, 1966

3,275,198
AIR STREAM DRIVEN PUMPING SYSTEM
Conrad R. Barlow, Redondo Beach, Calif., assignor, by mesne assignments, to Transland Aircraft, Inc., Redondo Beach, Calif., a corporation of California
Continuation of application Ser. No. 185,257, Apr. 5, 1962. This application Sept. 20, 1965, Ser. No. 502,793
13 Claims. (Cl. 222—310)

This invention relates to fluid handling systems for agricultural aerial applicating type aircraft. This is a continuation of copending application Serial No. 185,257, filed April 5, 1962, now abandoned, by Conrad R. Barlow for Fluid Handling System. Aerial applicating aircraft customarily carry hopper tanks containing either liquid or slurry (collectively called "fluid"), which is pumped to a spray boom and nozzle arrangement from which it is discharged onto the crops. Ordinarily a propeller-driven impeller type pump is used, both the pump and propeller being mounted squarely in the airstream of the aircraft.

Previously known conventional installations of this nature have had many significant disadvantages. One is the custom of placing a pump and propeller in the aircraft airstream, where the large frontal area of the pump sufficiently disturbs the air flow that the propeller is only partially efficient. Another disadvantage to this arrangement is the long tubing and plumbing from the hopper to the pump and from the pump to the spray boom, which causes considerable efficiency loss due to fluid friction. Also this tubing and plumbing in the airstream of the aircraft causes considerable aerodynamic drag.

In previously known installations, the pitch of the propellers has not been adjustable in flight and therefore the pump output ordinarily is in excess of the anticipated demand, causing considerable closed-circuit flow which wastes energy. Energy being derived from the reaction between the airstream and the propeller causes still more drag. When it is considered that aircraft used for aerial applications are usually light models and are required to fly extremely close to the ground carrying maximum payloads and at the end of each row a sharp climb and bank is required to overcome obstacles, it will be appreciated that unnecessary aerodynamic drag reduces the aircraft's performance, creating a very hazardous condition for the aircraft and pilot.

It is an object of this invention to provide a fluid handling system for aerial applicating type aircraft in which only the propeller and a small strut need be exposed head-on into the airstream; in which the plumbing and fluid friction has been cut to a minimum, and as much as possible of it is out of the airstream. A related object is to provide a system which is able to maintain the contents of a hopper tank in an agitated well-mixed condition.

A fluid handling system according to this invention comprises a hopper tank containing fluid to be pumped and a pump with an inlet and outlet port. The inlet port is connected to the tank. The control valve has an inlet port, a bypass (sometimes called a "return") port, and a supply port. The inlet port is connected to the pump housing; the bypass port is connected to the tank, and the supply port is connected to a spray boom and nozzle arrangement. A valve actuator is incorporated in the control valve, which is adapted to connect the inlet port from the pump to the bypass port, or to the supply port, or in varying proportions to both, thereby controlling the pressure and delivery rate at the supply port. Means is provided for driving the pump, preferably but not necessarily, by a propeller exposed to the airstream of the aircraft.

According to a preferred but optional feature of the invention, the pump is a rotary type which has a plane of rotation, and the means for driving the pump comprises a propeller having a plane of rotation, these planes forming a dihedral angle between them, whereby the propeller facing into the airstream of the aircraft, the pump sits at an angle thereto so as to confront the airstream with less than its major cross-sectional area.

According to still another preferred but optional feature of the invention, the axis of rotation of the pump is substantially upright, the pump including a shaft, an impeller wheel, and a shaft seal beneath the impeller wheel and sealing with the shaft, there being fluid passage means fluidly connecting the seal to the tank whereby the seal cannot be pumped dry.

The above and other features of this invention will be fully understood from the following detailed description and the accompanying drawings in which:

FIGURE 1 is a side elevation partly in cutaway cross-section showing the presently preferred embodiment of the invention;

FIGURE 2 is a fragmentary view partly in cutaway cross-section showing a portion of FIGURE 1;

FIGURE 3 is a cross-section taken at line 3—3 of FIGURE 2;

FIGURE 4 is a bottom view taken at line 4—4 of FIGURE 1; and

FIGURE 5 is a cross-section taken at line 5—5 of FIGURE 4.

In FIGURE 1, there is shown the bottom of a hopper tank 10, it being understood that this tank is mounted to an aircraft 11, the general direction of whose airstream (slip stream) is indicated by arrow 12. For purposes of this invention, it is unnecessary to illustrate the entire aircraft, only the under surface where the fluid handling system is located being shown. The bottom of the hopper tank has an opening 13 therein at which a system according to the invention is attached.

A mounting or base plate 14 is attached to the walls of opening 13 so as to close the same. This plate was a flange 15 through which holes pass to enable mounting bolts 16 to hold the mounting in sealing relationship against the underside of the hopper tank. The base plate includes holes 17, 18 and a dump port 19.

Hole 17 comprises a pump inlet for an impeller type pump 20. Pump 20 includes an impeller wheel 21, pump outlet 22 and pump shaft 23. The pump is enclosed in a housing 24, which has a shaft passage 25 directed downwardly, through which the shaft passes.

A shaft seal 26 makes a fluid seal between the housing and the shaft. Fluid passage means 27 comprise an open passage between the shaft seal and the pump inlet where, so long as there is fluid in the bottom of the hopper tank, there will be fluid at the seal, and it cannot be pumped dry by the impeller wheel. This arrangement, whereby the seal is beneath the pump and connected to a source of fluid, prevents the seal from being pumped dry and overcomes a substantial failing of conventional fluid handling systems.

The housing includes a strut mounting flange 28 to which there is bolted a strut 29. The strut extends downwardly and accommodates the pump shaft and, at right angles thereto, a propeller shaft 30. These shafts are interconnected by right angle bevel gears 31, which are mounted to their respective shafts and meshed.

Propeller 32 is mounted to the propeller shaft to turn the same.

A control valve 35 is formed integral with the pump housing. The control valve includes a supply port 36 an inlet port 37, and a return port 39. The inlet port is connected to the pump outlet. The return port is connected to hole 18 to discharge directly back into the bottom of the hopper tank. The supply port is connected to conduit 39 which forms an extension of a spray boom (not shown).

The control valve includes a valve operator 40 which is a rotary member mounted to shaft 41. In the preferred embodiment, the operator has an arcuate closure surface 42 of sufficient arcuate extent that it is adapted at certain of its positions to overlie more than one of the valve ports. Its rotary position is adjusted by linkage 43. As illustrated in FIGURE 1, the valve operator is in position to provide for straight flow from the pump to the spray boom. By rotating the valve operator counterclockwise, the return port may gradually be opened as the supply port is gradually closed, thereby providing for variable flow rates and pressures to the supply boom.

The propeller shaft has a central passage 45 therethrough which receives a push rod 46, which forms a portion of propeller pitch control linkage 47. This linkage includes a hinge 48 mounted to the strut. Rod connections extend to the cockpit. Rotation of bell crank 49 around hinge 48 moves the push rod forwardly and rearwardly; that is, to the left and right, in FIGURE 1.

The propeller includes a hub 50, which mounts a pair of propeller blades 51, 52. Each of the propeller blades is adapted to rotate about its respective axis 53, 54, thereby to adjust the pitch in the respective blade. The blades include respective shafts 55, 56, which are mounted to bearing 57 in the hub. There is pinned to each of shafts 55 and 56 a gear 58, 59, both of these gears being engaged by a rack 60 on push rod 46.

Movement of the pitch control linkage to move the rack to the right and left in FIGURE 3 results in adjustably changing the pitch of the respective propeller blades. It will thereby be seen that for any given air speed, the speed of rotation of the propeller can be adjusted by adjusting the pitch of the blades, and this is a direct control over the pressure and flow derivable from the pump. The control valve further regulates the quantity and pressure of delivery to the spray boom. The quantity returned to the tank through the return port aids in keeping the contents of the hopper tank thoroughly mixed by agitation.

FIGURES 4 and 5 further illustrates mechanism associated with dump port 19, which comprises a dump gate 65 hinged to base plate 14 by hinge 66, the hinge being disposed at the forward end of the base plate relative to the motion of the aircraft through the air. A dump linkage 67, comprising a hinged lock 68, is adapted to hold the dump gate in the position of FIGURE 5, closing the dump port until the lock is pulled, by pulling the lower end of lever 69 to the left in FIGURE 5 to pull retainer 70 out of the path of the dump gate. This permits the dump gate to drop open and dump the contents of the hopper tank.

In view of the above, several advantages of the invention can readily be understood. The system is readily attachable to the bottom of a hopper tank simply by attachment of the base plate. The pump and control valve are readily cast in a single convenient housing with the plane of rotation of the impeller substantially parallel to the airstream. In this manner, less than the major cross-sectional area of the pump faces into the airstream. For example, conventional devices have the impeller wheel lying 90° to the position illustrated in FIGURE 1 with its circular plane facing into the airstream. This tends to create a considerable drag, particularly when concentric with the propeller as has been the almost uniform custom heretofore. As illustrated, the plane of rotation of the propeller and the plane of rotation of the impeller wheel form a dihedral angle, in this case substantially 90°, so that with the propeller facing directly into the airstream, less than the major cross-section of the pump faces the stream.

Another advantage is that the fluid connections within the system are all short, and contained in a smooth, compact pumping unit which can include relatively large pumping orifices and conduits which introduce a minimum amount of fluid friction in the system. Long lines and energy-consuming bends are eliminated in the pumping and return system.

It is possible, of course, to introduce additional relief valves for controlling maximum pressures in the system, but due to the adjustability of the propeller and the control valve, this often will be unnecessary.

This invention thereby provides a system which is flexible in use in the sense that it is subject to easy adjustments as to pressure, flow rates, and return-cycling rates, which drastically reduces pressure loss that otherwise results from fluid passing through tube bends and extended lengths of conventional plumbing systems, and which much of it is readily integrated in a simple casting. Greater efficiency and safety are provided both for the system itself and for the aircraft which carries it. Also, by using the base plate to mount the system, it is readily adaptable to any installation having a hopper throat with an open bottom.

This invention is not to be limited by the embodiment shown in the drawings and described in the description which is given by way of example and not of limitation, but only in accordance with the scope of the appended claims.

1. A fluid handling system adapted to be mounted in an opening in the bottom of a tank having a port in the bottom thereof, comprising:

a base plate attachable to the bottom of the tank, said base plate having a pair of holes; a rotary pump mounted underneath one of said holes and rotating in a plane in close proximity and parallel to the extension of the base plate, said pump having an outlet port extending substantially at right angles to said one hole;

means for selectively connecting said outlet port to the other one of said pair of holes and to conduit means provided for connection to a spray boom;

a propeller drivingly connected to the pump for driving said pump; and means for mounting said propeller to said base plate so that the propeller faces the airstream, with the airstream in the axial region of the propeller bypassing the pump, said propeller having a plane of rotation, said planes forming a dihedral angle so that said pump sits at an angle to the airstream and to confront the airstream with less than its major cross-sectional area.

2. A fluid handling system adapted to be mounted in an opening in the bottom of a tank having a port in the bottom thereof, comprising:

a base plate attachable to the bottom of the tank, said base plate having at least one hole, a rotary pump mounted underneath said hole and rotating in a plane in close proximity and parallel to the extension of the base plate, and to the airstream along the underside of an aircraft, said pump having an outlet port extending substantially at right angles to said one hole, said outlet port provided for connection to a spray boom;

a strut extending downward from said plate and said pump;

a right angle drive connected to said pump and extending through said strut, said right angle drive including a driven axis which is remote from said pump; and a propeller on said strut and drivingly connected to said drive angle drive at said axis, said propeller defining a plane of rotation at a right angle to said plane of rotation of said pump, said propeller facing said airstream.

3. A fluid handling system adapted to be mounted in an opening in the bottom of a tank having a port in the bottom thereof, comprising:

a base plate attachable to the bottom of the tank, said base plate having a pair of holes, a rotary pump mounted underneath one of said holes and rotating in a plane in close proximity and parallel to the extension of the base plate, said pump having an outlet port extending substantially at right angles to said one hole;

a valve mounted on said plate underneath the other one of said holes and having a return port in fluid communication with said other hole, said valve further having an inlet port connected to said outlet port of said pump, said valve further having a supply port for connection to a spray boom;

a valve operator in the control valve for selectively connecting the inlet port to the return port and the supply port in varying proportions to control pressure and supply rates to the spray boom;

a strut extending downward from said plate and said pump; and a propeller on said strut facing into the airstream of an aircraft and having an axis remote from said pump so that at least the air flow central to the propeller bypasses the pump, the propeller being drivingly connected to the pump for driving said pump, said propeller having a plane of rotation, said plane forming a dihedral angle so that said pump sits at an angle to the airstream so as to confront the airstream with less than its major cross-sectional area.

4. A fluid-handling system adapted to be mounted in an opening in the bottom of a tank having a port in the bottom thereof, comprising:

a base plate attachable to the bottom of the tank, said base plate having a pair of holes, and a dump port therethrough;

a pump mounted to the plate having an inlet and an outlet, the outlet being in fluid communication with one of said holes, the pump being a rotary type with a plane of rotation in parallel to the airstream of an aircraft;

a control valve under the other one of said holes and having an inlet port, a supply port, and a return port, the inlet port being connected to the pump outlet, the return port being in fluid communication with said other of said holes, and the support port being connectible to the spray boom;

a valve operator in the control valve adapted to selectively connect the inlet port to the return port, and to the supply port in varying proportions to both, thereby to control pressure and supply rates to the supply port; a gate mounted to said plate closing said dump port and releasable to open the same;

a propeller for driving the pump; and means for mounting said propeller so that its plane of rotation and the plane of said pump form a dihedral angle, whereby the propeller faces said airstream.

5. In a system of the class described, a mounting plate having a hole for fluid communication with a tank, said plate for mounting at the underside of an aircraft containing the tank, so as to form a part of the hull of the aircraft;

a rotary pump mounted on said plate at said hole and having a plane of rotation substantially parallel to the flow of air along said plate, said pump being covered so that its axial dimension faces said flow of air;

a pipe for connection to spray booms, said pipe extending from the pump along the plate and substantially in the direction of said airflow;

a strut extending from said plate and said pump and into the airstream when flowing along the hull of the aircraft;

a propeller mounted on the strut so that the propeller faces the airstream, and at least the airflow in the vicinity of the axis of the propeller bypassing the pump to be driven by said airstream; and means in the strut for drivingly connecting the propeller to the pump for said propeller to drive said pump.

6. A fluid-handling system adapted to be mounted in an opening in the bottom of a tank having a port in the bottom thereof, comprising:

a base plate attachable to the bottom of the tank, said base plate having a pair of holes, and a dump port therethrough;

a pump mounted to the plate having an inlet and an outlet;

the inlet being in fluid communication with one of said holes, the pump being a rotary type with a plane of rotation;

a control valve having an inlet port, a supply port, and a return port, the inlet port being connected to the pump outlet, the return port being in fluid communication with the other of said holes, and the support port being connectible to the spray boom;

a valve operator in the control valve adapted to selectively connect the inlet port to the return port, or to the supply port, or in varying proportions to both, thereby to control pressure and supply rates to the supply port;

a gate mounted to said plate closing said dump port and releasable to open the same; and means for driving the pump comprising a propeller rotation, said planes forming a dihedral angle, whereby with the propeller facing into the airstream of an aircraft, the pump sits at an angle thereto as to confront the airstream with less than its major cross-sectional area, and outside the airflow of the propeller.

7. A fluid-handling system according to claim 6 in which the shaft includes right angle gearing, and in which the propeller is supported in the airstream by a strut.

8. A fluid-handling system according to claim 6 in which the pitch of the propeller is adjustable.

9. A fluid-handling system according to claim 6 in which the propeller includes a central hub and a plurality of blades mounted to the hub and projecting therefrom, each of said blades being mounted so as to be rotatable about its own axis, and in which a gear is mounted to each blade coaxially therewith; and in which a shiftable rack engages each of said gears for adjustably rotating the blades on their axes, and in which means are provided for shifting the rack.

10. A fluid-handling system according to claim 6 in which the axis of rotation of the pump is substantially upright, and in which the pump includes a shaft, an impeller wheel, and a shaft seal underneath the impeller wheel, and in which fluid passage means fluidly connect the seal to the tank.

11. A fluid-handling system adapted to be mounted in an opening in the bottom of a tank having a port in the bottom thereof, comprising: a base plate attachable to the bottom of the tank, said base plate having a pair of holes;

a pump mounted to the plate having an inlet and an outlet, the inlet being in fluid communication with one of said holes, the pump being a rotary type with a plane of rotation;

a control valve having an inlet port, a supply port, and a return port, the inlet port being connected to the pump outlet, the return port being in fluid communication with the other of said holes, and the support port being connectible to the spray boom;

a valve operator in the control valve adapted to selectively connect the inlet port to the return port, or to the supply port, or in varying proportions to both, thereby to control pressure and supply rates to the supply port; and means for driving the pump comprising a propeller facing into the airstream of an aircraft and having a plane of rotation, said planes forming a dihedral angle, the pump sits at an angle to the plane of rotation of the propeller so as to confront the airstream with less than its major cross-sectional area.

12. A fluid-handling system adapted to be mounted in an opening in the bottom of a tank having a port in the bottom thereof, comprising:

a base plate attachable to the bottom of the tank, said base plate having a pair of holes;

a pump mounted to the plate having an inlet and an outlet;

the inlet being in fluid communication with one of said holes, the pump being a rotary type with a plane of rotation extending in parallel to the airstream of an aircraft;

a control valve having an inlet port, a supply port, and a return port, the inlet port being connected to the pump outlet, the return port being in fluid communication with the other of said holes, and the support port being connectible to the spray boom;

a valve operator in the control valve adapted to selectively connect the inlet port to the return port, or to the supply port, or in varying proportions to both, thereby to control pressure and supply rates to the supply port;

a propeller for driving said pump having an axis of rotation displaced from said pump and having a plane of rotation extending substantially at right angles to said plane of said pump so that the propeller faces into the airstream and the pump confronts the airstream at most with its cross-sectional area as measured in axial direction.

13. A fluid-handling system adapted to be mounted in an opening in the bottom of a tank having a port in the bottom thereof, comprising:

a base plate attachable to the bottom of the tank, said base plate having a pair of holes, and a dump port therethrough; a pump mounted to the plate having an inlet and an outlet, the inlet being in fluid communication with one of said holes, the pump being a rotary type with a plane of rotation;

a control valve having an inlet port, a supply port, and a return port, the inlet port being connected to the pump outlet, the return port being in fluid communication with the other of said holes, and the support port being connectible to the spray boom;

a valve operator in the control valve adapted to selectively connect the inlet port to the return port, or to the supply port, or in varying proportions to both, thereby to control pressure and supply rates to the supply port; a gate mounted to said plate closing said dump port and releasable to open the same; and means for driving the pump comprising a propeller having a plane of rotation, said planes forming a dihedral angle, whereby with the propeller facing into the airstream of an aircraft, the pump sits at an angle thereto as to confront the airstream with less than its major cross-sectional area.

References Cited by the Examiner

UNITED STATES PATENTS

| | | | |
|---|---|---|---|
| 1,283,529 | 11/1918 | Keckler | 158—36 |
| 2,382,412 | 8/1945 | Gery et al. | 103—87 |
| 2,504,580 | 4/1950 | Person | 222—318 X |
| 2,599,307 | 5/1952 | Woodson | 222—383 |
| 2,717,106 | 9/1955 | Hammer | 222—333 X |
| 2,851,114 | 9/1958 | Rossman | 170—160.43 |

ROBERT B. REEVES, *Primary Examiner.*

HADD S. LANE, *Examiner.*